United States Patent [19]
Attanasio

[11] Patent Number: 5,690,460
[45] Date of Patent: Nov. 25, 1997

[54] FASTENER ASSEMBLY FOR ATTACHING A COVER TO A PANEL

[75] Inventor: Jerry E. Attanasio, Middlebury, Conn.

[73] Assignee: Pilgrim Screw Corporation, Providence, R.I.

[21] Appl. No.: 763,609

[22] Filed: Dec. 11, 1996

[51] Int. Cl.$^6$ .................................................. F16B 21/00
[52] U.S. Cl. ........................ 411/551; 411/552; 411/553
[58] Field of Search ............................... 411/108, 109, 411/178, 432, 438, 551, 552, 553, 555

[56] References Cited

U.S. PATENT DOCUMENTS

| | | |
|---|---|---|
| 2,878,542 | 3/1959 | Summers et al. . |
| 2,881,499 | 4/1959 | Summers et al. . |
| 3,169,293 | 2/1965 | Neuschotz ............................ 411/552 |
| 3,488,815 | 1/1970 | Metz ..................................... 411/555 |
| 3,495,307 | 2/1970 | Metz ..................................... 411/555 |
| 3,675,280 | 7/1972 | Winslade .............................. 411/552 |
| 4,166,309 | 9/1979 | Schenk ............................. 411/438 X |
| 4,442,571 | 4/1984 | Davis et al. . |
| 5,059,075 | 10/1991 | Kelly . |

Primary Examiner—Neill R. Wilson
Attorney, Agent, or Firm—Salter & Michaelson

[57] ABSTRACT

A fastener assembly for attaching a cover to a panel includes a stud assembly mounted on the cover and having a stud extending through an opening formed in the cover. The stud has a shank portion which extends through the opening in the cover, a head portion provided on an upper end of the shank portion, and a cross pin provided on a lower end of the shank portion. A grommet is secured to the cover within the opening of the cover for attaching the stud to the cover. The fastener assembly further includes a receptacle assembly including a receptacle barrel having a cylindrical wall with an interior surface having female threads formed thereon. The receptacle assembly further includes an insert having a cylindrical body with an exterior surface having male threads formed thereon. A helix is disposed between the receptacle barrel and the insert, the helix being fabricated from wire-like material and having alternating large and small diameter loops extending along the length of the helix. When releasably attaching the stud assembly to the receptacle assembly, the helix prevents the axial movement of the insert with respect to the barrel. Preferably, the helix has a diamond-shaped cross section which defines, for each coil of the helix, opposite, pointed side edges which are received within grooves constituting the female threads of the barrel and the male threads of the insert.

19 Claims, 7 Drawing Sheets

FASTENER ASSEMBLY FOR ATTACHING A COVER TO A PANEL

BACKGROUND AND SUMMARY OF THE INVENTION

This invention relates generally to fasteners, and more particularly to a fastener assembly used in high stress environments for attaching a cover to a panel, such as for covers used to close access openings in panels of an aircraft.

Fasteners for attaching a cover to a panel are well-known in the art. One type of fastener, known as a quarter-turn fastener, is especially designed for use in high stress environments, such as for covers used to protect aircraft access panels, e.g., in helicopters. Such fasteners must be able to maintain secure attachment of the cover to the panel during conditions of excessive vibration and high loads applied to the cover caused by wind and other similar hydrodynamic factors.

One type of quarter-turn fastener includes a stud that is attached to the cover and a receptacle that is attached to the panel for releasably securing the stud thereto. Due to variations of the thickness of the cover and panel material, especially with modern composite materials, the quarter-turn fastener must be capable of adjusting the depth of the engagement between the stud and the receptacle to accommodate the non-conforming material thickness and still maintain a tight engagement between the cover and the panel. To make it more adjustable, the fastener further includes an insert having an outer surface with male threads formed thereon which threadably engage female threads formed on the inner surface of the receptacle. Thus, during installation of the fastener, the insert is first threadably attached to the receptacle and the stud is received in the insert and secured thereto by any suitable means. For example, in U.S. Pat. Nos. 2,878,542 and 2,881,499, both to Summers et al., the lower portion of the stud can be formed with a shoulder or abutting portion that selectively engages a mating shoulder or abutting portion of the insert. The insert can be axially moved so as to ensure a tight and secure attachment of the cover to the panel.

One problem with the foregoing fastener construction is that the insert can axially move or "creep" with respect to the receptacle. One well-known solution to prevent the insert from creeping is to pin the insert to the receptacle. However, this solution suffers from the disadvantage that the pin cannot withstand the constant and localized loads being applied thereto, and, as a result, can fail during especially stressful loads. Also, this method of fixing the insert with respect to the receptacle is very time-consuming and costly to implement since it must be performed on site, and many times, there are hundreds of such fasteners that need pinning.

Another solution is disclosed in the Summers et al. patents. As disclosed, a coil can be disposed between the receptacle and the insert whereby the insert frictionally engages the coil when being threaded into the receptacle for preventing axial movement between the insert and receptacle. However, as shown in these patents, the coil has a round cross-sectional area, and as a result, is not particularly effective in preventing axial creep. In fact, the ends of the coil are turned inwardly and are received in radial slots formed in the ends of the insert. This construction prevents the coil from circumferential creep which indicates that the coil is not locked in place with respect to the insert and receptacle.

There is presently a need in the fastener art for a fastener which can accommodate covers and panels having varying thicknesses, and which provides a secure and safe attachment between the cover and the panel.

In general, the present invention is directed to a fastener assembly for attaching a cover to a panel. The fastener assembly comprises a stud assembly mounted on the cover, the stud assembly including a stud extending through an opening formed in the cover. The stud has a shank portion which extends through the opening in the cover, a head portion provided on an upper end of the shank portion, and a cross pin provided on a lower end of the shank portion. A grommet is secured to the cover within the opening of the cover. The grommet defines an opening for receiving the shank portion of the stud therethrough wherein the head portion and cross pin of the stud prevent the axial removal the stud from the opening of the grommet. A spring is further provided and is engageable at its lower end with the grommet and at its upper end with the head portion of the stud for biasing the head portion of the stud away from the cover.

The fastener assembly further comprises a receptacle assembly including a receptacle barrel having a cylindrical wall defining an opening of the barrel. The cylindrical wall has an interior surface with female threads formed thereon. The receptacle assembly further includes an insert having a cylindrical body defining a bore of the insert, an exterior surface with male threads formed thereon, and a cam formation formed on the lower end of the insert. The bore receives the shank portion and cross pin of the stud therethrough when releasably attaching the stud assembly to the receptacle assembly wherein the cross pin engages the cam formation of the insert for axially locking the stud to the insert.

A helix is disposed between the receptacle barrel and the insert, the helix being fabricated from wire-like material and having alternating large and small diameter loops extending along the length of the helix. When releasably attaching the stud assembly to the receptacle assembly, the helix prevents the axial movement of the insert with respect to the barrel. Preferably, the helix has a diamond-shaped cross section which defines, for each coil of the helix, opposite, pointed side edges which are received within grooves constituting the female threads of the barrel and the male threads of the insert.

Accordingly, among the several objects of the present invention are the provision of an improved fastener assembly which can accommodate covers and panels having varying thicknesses; the provision of such a fastener assembly which is fabricated from high strength, corrosion resistant material and is compatible with high strength composite materials constituting the cover and panel; the provision of such a fastener assembly which is easy to install and requires no tooling to axially lock an insert of the fastener assembly to a receptacle barrel of the assembly; the provision of such a fastener assembly which eliminates precise machining and intricate assembly procedures for producing the fastener assembly; the provision of such a fastener assembly which eliminates friction between the fastener assembly and its adjacent surfaces; the provision of such a fastener assembly which distributes stress loads equally throughout the receptacle barrel of the fastener assembly; and the provision of such a fastener assembly which is cost-efficient in manufacture and installation.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

Corresponding reference numerals designate corresponding parts throughout the several views of the drawings.

DETAILED DESCRIPTION OF THE PREFERRED EMBODIMENT

Figure 1:
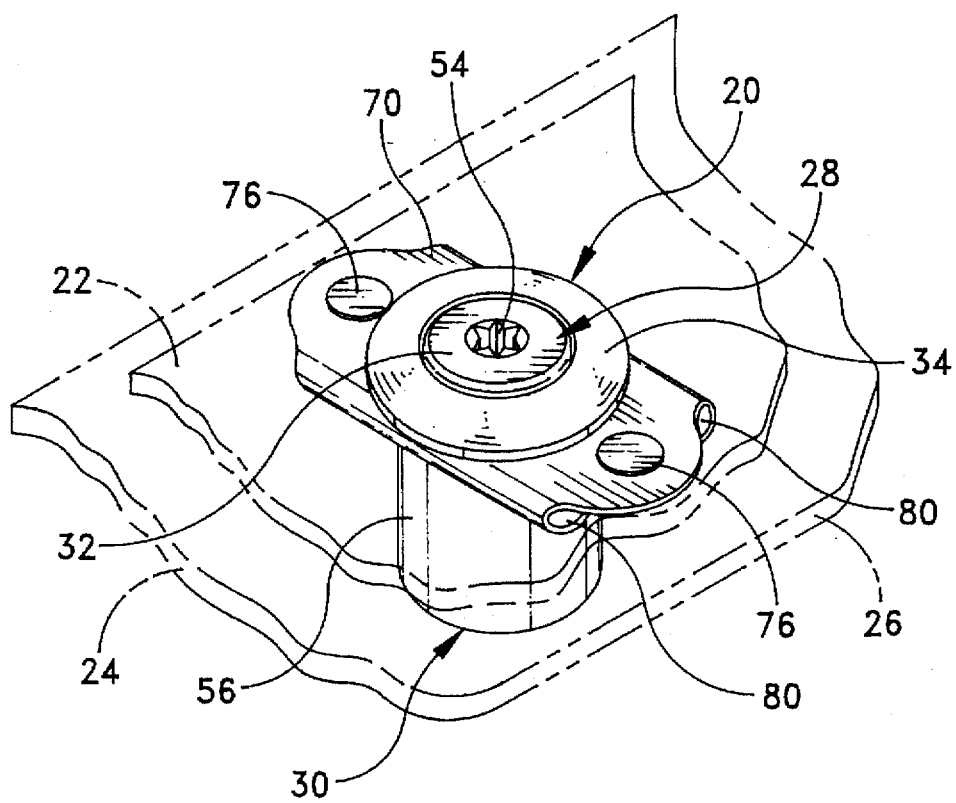
FIG. 1 is a perspective view of a fastener assembly of the present invention, the fastener assembly being used in combination with other fastener assemblies (not shown) to attach a cover to a panel.
Figure 2:
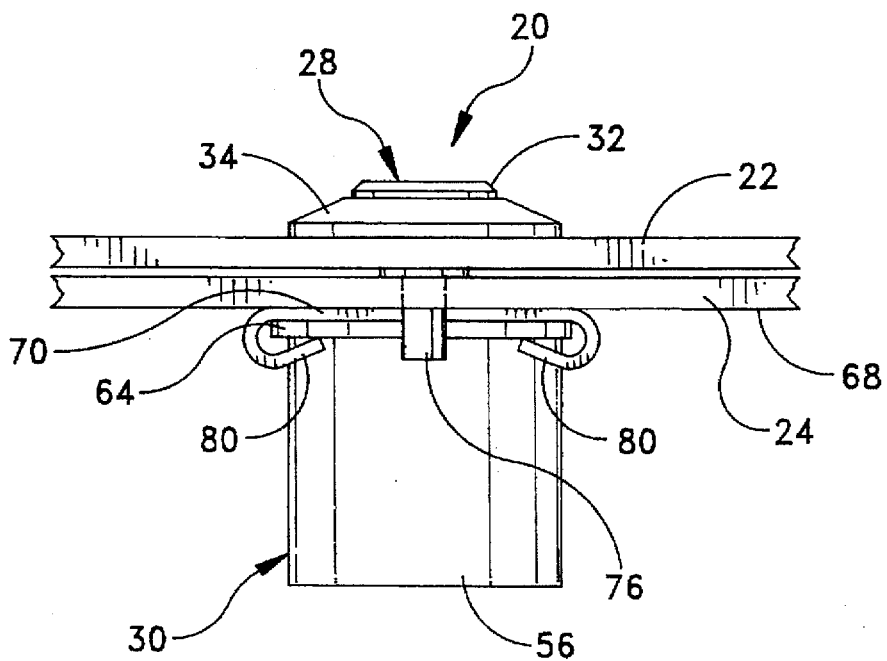
FIG. 2 is a side elevational view of the fastener assembly.
Figure 3:
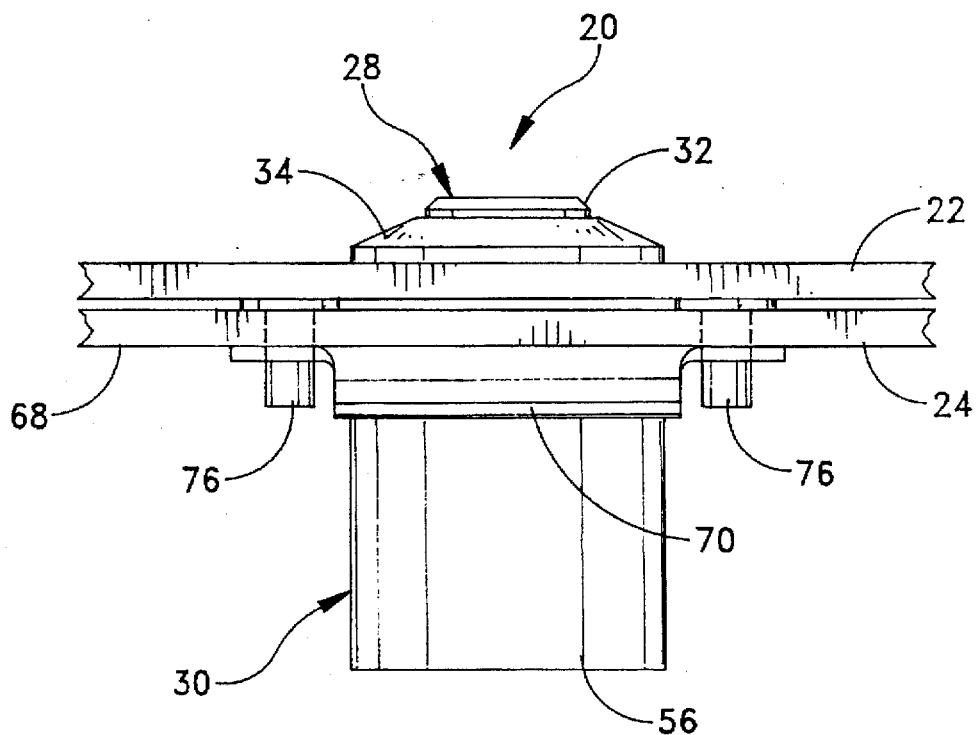
FIG. 3 is a front elevational view of the fastener assembly.

Referring now to the drawings, and more particularly FIGS. 1 through 4, there is generally indicated at 20 a fastener assembly of the present invention which is especially suited for attaching, with other fastener assemblies (not shown), a cover 22 to a panel 24. In the aircraft and aerospace industry, there are a plurality of access openings, such as the opening defined by edge 26 in FIG. 1, formed in body panels of an aircraft, for example, the openings providing access to the interior of the aircraft from outside the aircraft. These openings are oftentimes each provided with a cover that is releasably secured to the panel by a plurality of fastener assemblies. As discussed briefly above, the covers must be securely and tightly attached to the panels so as to eliminate any unwanted hydrodynamic forces which may cause the covers to be disassociated from the panels. Thus, the fastener assembly 20 of the present invention is designed to provide a tight, secure and reliable attachment of the cover 22 to the panel 24, notwithstanding any variation in thicknesses of the cover and the panel.

FIGS. 1 through 4 illustrate a single fastener assembly 20 comprising a stud assembly, generally indicated at 28, and a receptacle assembly, generally indicated at 30. As shown, the stud assembly 28 is secured to the cover 22, the cover being fabricated from a sheet of metallic or composite material. As discussed above, the sheet, if fabricated from composite material, can vary significantly in thickness over the length and width of the sheet. The receptacle assembly 30 is secured to the panel 24 adjacent the edge 26 of the opening formed by the panel 24. The panel 24 is also fabricated from a sheet of metallic or composite material. It should be understood that a plurality of such fastener assemblies 20 are typically required to attach the cover 22 to the panel 24, and that for the purposes of economy only one fastener assembly 20 is illustrated throughout the drawings.

Figure 5:
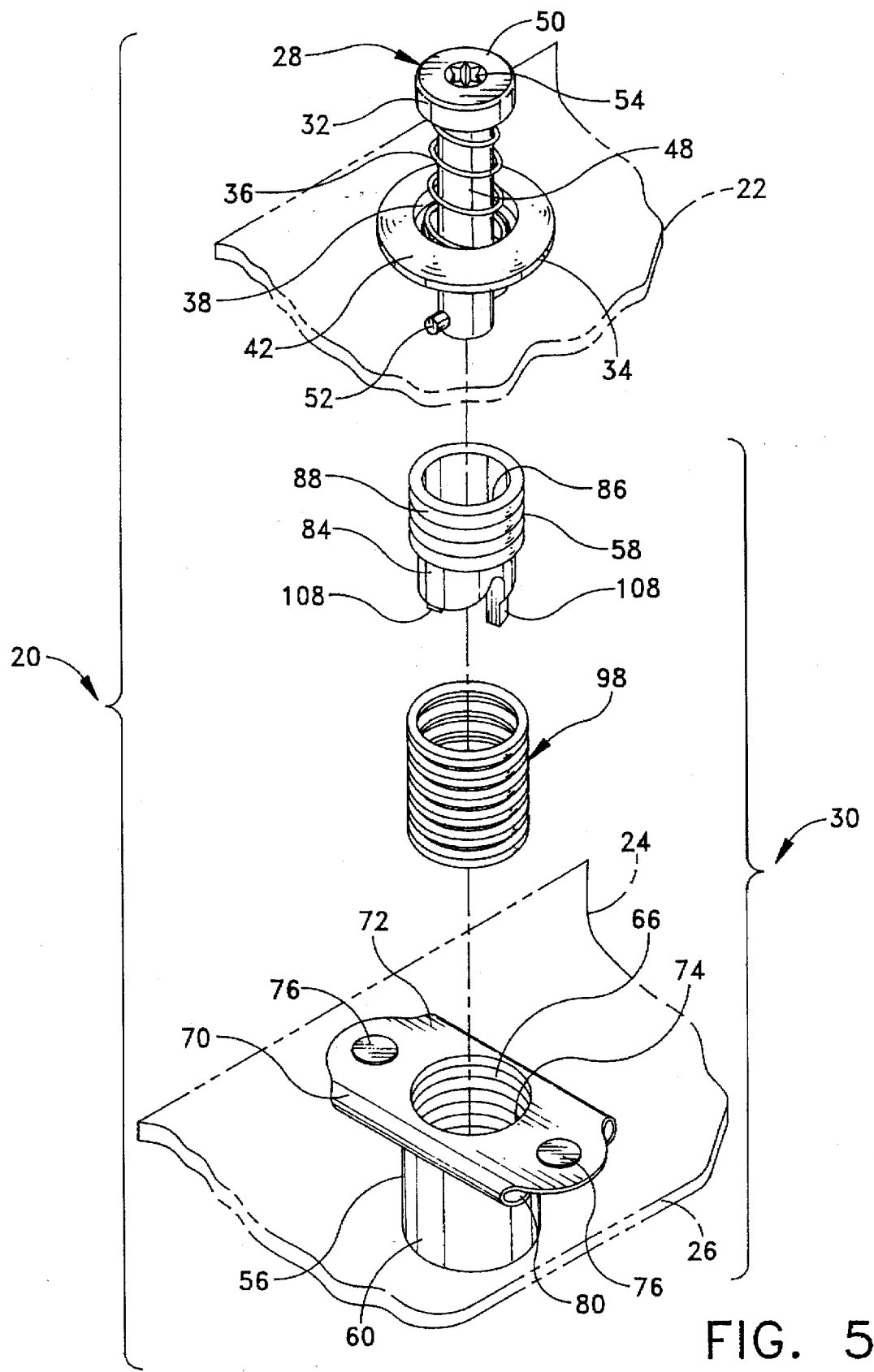
FIG. 5 is an exploded perspective view of the fastener assembly.
Figure 6:
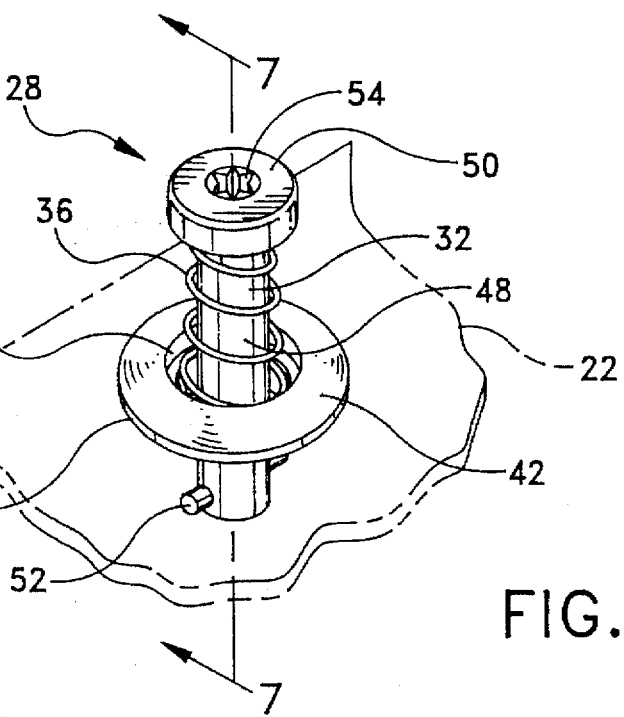
FIG. 6 is a perspective view of a stud assembly of the fastener assembly.
Figure 7:
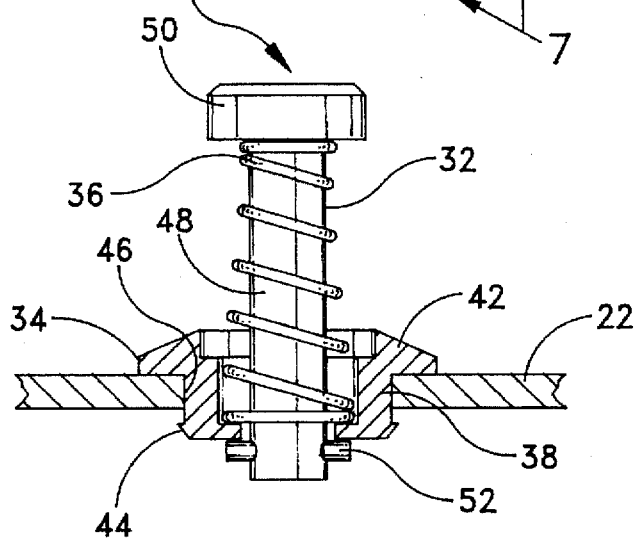
FIG. 7 is a cross-sectional view of the stud assembly taken along line 7—7 of FIG. 6.
Figure 8:
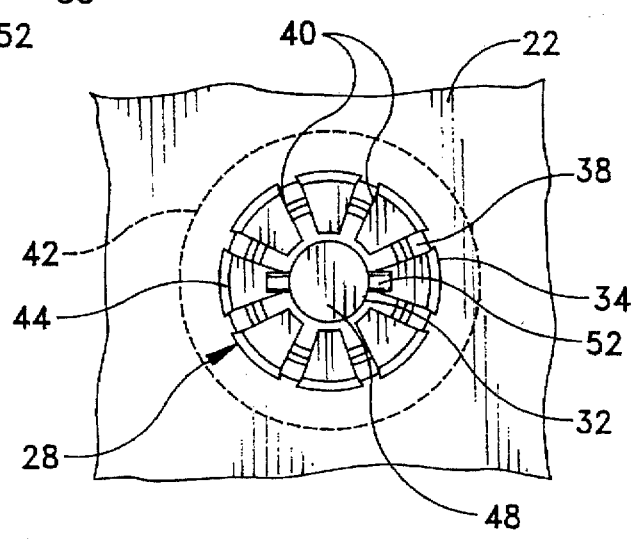
FIG. 8 is a bottom plan view of a grommet of the stud assembly.
Figure 9:
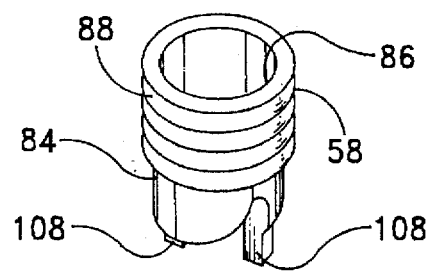
FIG. 9 is a perspective view of an insert of a receptacle assembly of the fastener assembly.

Referring now to FIGS. 5 through 8, the stud assembly 28 includes three primary components, namely a stud 32, a grommet 34, and a spring 36. As shown in FIGS. 6 through 8, the grommet 34 includes a cylindrical body portion 38 having a plurality of vertically oriented slots 40 formed therein, and an outwardly flaring flange portion 42 located at the upper end of the body portion 38. An outwardly projecting lip 44 is formed at the lower end of the body portion 38 so that the flange portion 42 and the lip 44 prevent the axial movement of the grommet 34 with respect to the cover 22. A circular opening 46 formed in the cover 22 is sized to snugly receive the body portion 38 of the grommet 34 therein. The grommet 34 is press fit into the opening 46 of the cover 22 by virtue of the slots 40 formed in the body portion 38 which enables body portion 38 to reduce its diameter for allowing the lip 44 of the grommet to clear the edge of the opening 46. Once the lip 44 moves past the edge of the opening 46 when inserting the grommet 34 in the opening 46, the body portion 38 returns to its original diameter wherein the flange portion 42 and the lip 44 prevent the grommet 34 from being axially removed from the cover 22.

The stud 32 includes a vertically oriented (as shown), cylindrical shank portion 48 having a diameter less than the inner diameter of the grommet 34. The stud 32 further includes a head portion 50 provided on the upper end of the shank portion 48 and a cross pin 52 provided on a lower end of the shank portion 48. As shown, the head portion 50 has a cavity 54 formed in its upper surface for receiving a tool (e.g., a star wrench, not shown) to rotate the stud 32 about its longitudinal axis. It should be noted that the cavity 54 can assume any number of shapes for accommodating various tools (e.g., screwdrivers, wrenches, etc.) and still fall within the scope of the present invention. The cross pin 52 can be integrally formed with the shank portion 48 of the stud 32, or by a separate process where a cross bore is formed in the shank portion and the pin is press-fit within the cross bore.

The spring 36 is engageable at its lower end with the grommet 34 and at its upper end with the head portion 50 of the stud 32. As shown in FIGS. 6 and 7, the spring 36 biases the stud 32 upwardly with respect to and away from the cover 22. This arrangement exposes the head portion 50 of the stud 32 so as ease the connection between the stud assembly 28 and receptacle assembly 30. Preferably, the components of the stud assembly 28 are fabricated from high strength, corrosion resistant material, such as stainless steel.

Turning back to FIGS. 1 through 5, the receptacle assembly 30 includes a receptacle barrel 56 and an insert 58 that is received within the receptacle barrel 56. As shown, the receptacle barrel 56 has a cylindrical wall 60 that defines an elongate opening 62 of the barrel 56 and a circumferential flange 64 provided at an open (upper) end of the cylindrical wall 60. The cylindrical wall 60 of the receptacle barrel 56 has an interior surface which is suitably formed to have female threads 66.

The receptacle barrel 56 is attached to an interior surface 68 of the panel 24 by means of a bracket 70 which enables the receptacle barrel 56 to be laterally aligned with the stud fastener assembly 28 when releasably securing the stud fastener assembly thereto. More particularly, the bracket 70 includes a wall portion 72 having a large central opening 74 formed therein (see FIG. 5) which is mounted on the inner surface 68 of the panel 24 by a pair of rivets 76 (see FIG. 3). The opening 74 of the bracket 70 is aligned with a like-sized opening 78 formed in the panel 24. The lateral sides of the wall portion each have a curled tab portion 80 integrally formed therewith. The curled tab portions 80, prior to the attachment of the receptacle barrel 56 to the bracket 70, lie along a plane generally parallel to the plane of the wall portion 72. As shown, each curled tab portion 80 has a semi-circular cut out 82 formed therein, the purpose of which will be discussed below. Since the bracket 70 does not carry any of the structural load when securing the cover 22 to the panel 24, but is merely sandwiched between the stud and receptacle assemblies 28, 30, it can be fabricated from a relatively inexpensive material, such as aluminum.

Figure 4:
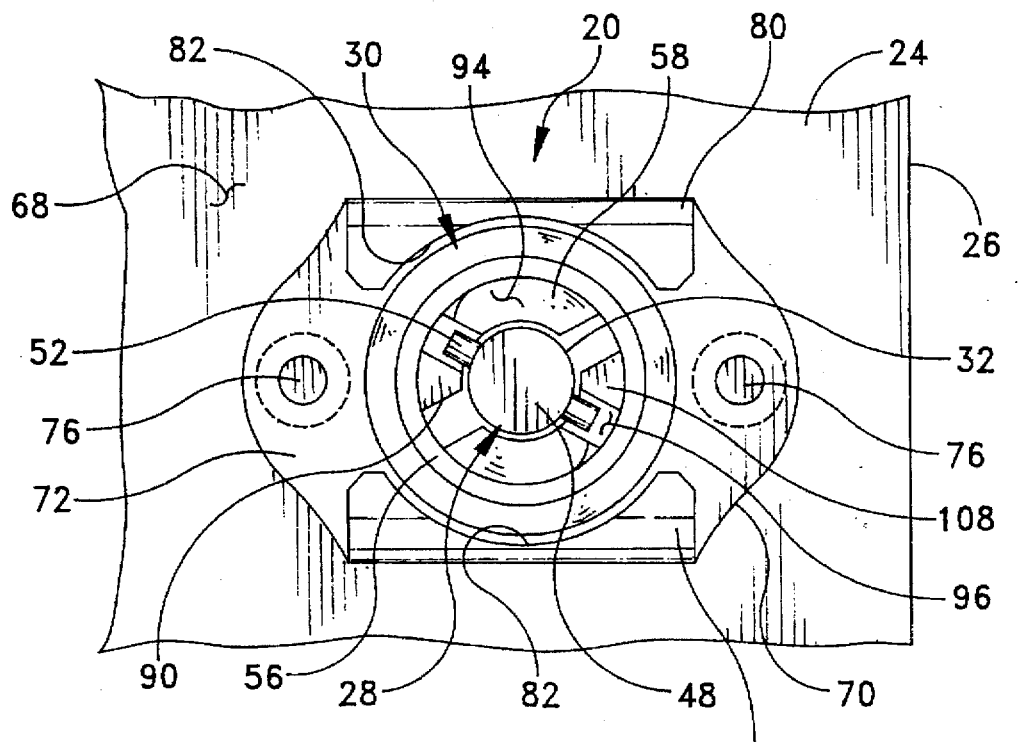
FIG. 4 is a bottom plan view of the fastener assembly.
Figure 15:
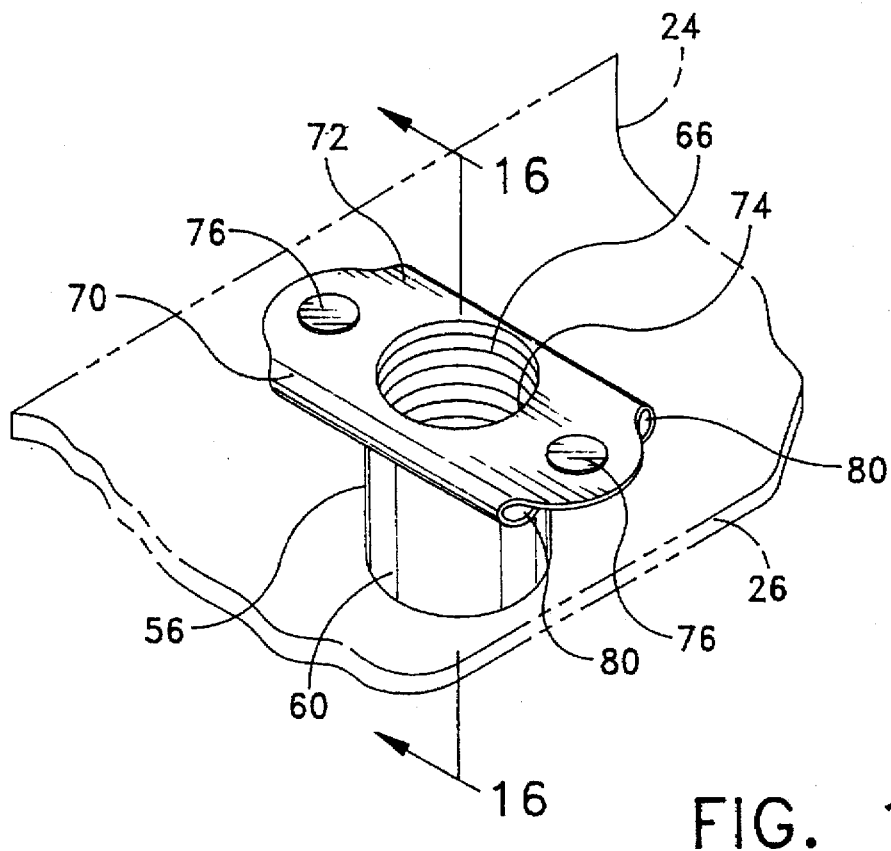
FIG. 15 is a perspective view of a receptacle barrel of the receptacle assembly.
Figure 16:
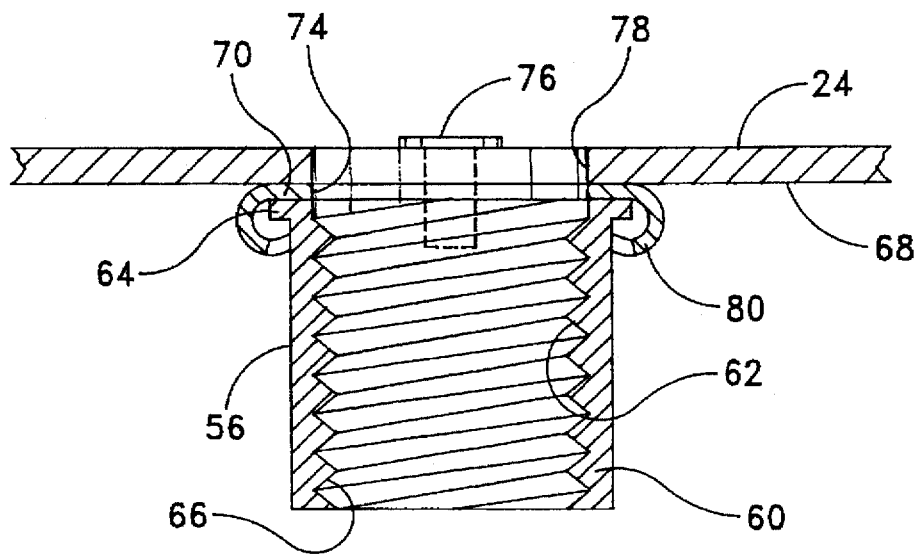
FIG. 16 is a cross-sectional view of the receptacle barrel taken along line 16—16 of FIG. 15.

To mount the receptacle barrel 56 on the bracket 70, the elongate opening 62 formed by the cylindrical wall 60 of the barrel 56 is aligned with the large opening 74 of the bracket 70. The tab portions 80 are then bent over the flange 64 of the barrel 56 for axially retaining the barrel 56 to the bracket 70. As best shown in FIGS. 4, the semi-circular cut outs 82 have a diameter slightly greater than the diameter of the cylindrical wall 60 of the receptacle barrel 56 for enabling the barrel 56 to slightly move from side-to-side. This enables the stud assembly 28 to be aligned with the receptacle assembly 30 even if there is minor misalignment between the location of the openings 46, 78 of the cover 22 and the panel 24, respectively. FIGS. 15 and 16 further illustrate the attachment of the receptacle barrel 56 to the bracket 70.

Referring now to FIGS. 9 through 12, the insert 58 of the receptacle assembly 30 has a cylindrical body 84 which defines a bore 86 of the insert 58. The exterior surface of the body 84 of the insert 58 has male threads 88 formed thereon. The bore 86 of the insert 58 terminates at its lower end to form an aperture 90 shaped to receive the shank portion 48 and cross pin 52 therethrough (see FIGS. 11 and 12). The lower end of the body 84 of the insert 58 has a cam formation 92 formed thereon. The arrangement is such that the bore 86 and aperture 90 of the insert 58 receive the shank portion 48 and cross pin 52 of the stud 32 therethrough when releasably attaching the stud assembly 28 to the receptacle assembly 30 wherein the cross pin 52 passes through the bore 86 and aperture 90 and engages the cam formation 92 of the insert 58 for axially locking the stud 32 to the insert.

Figure 10:
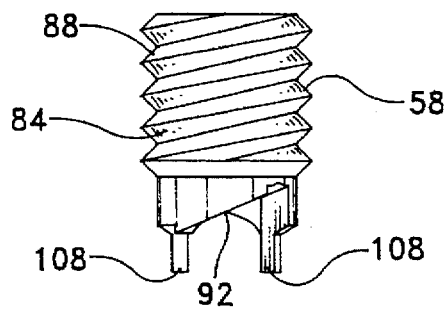
FIG. 10 is a side elevational view of the insert.
Figure 11:
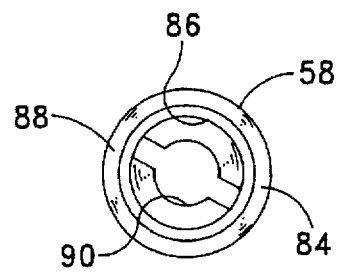
FIG. 11 is a top plan view of the insert.
Figure 12:
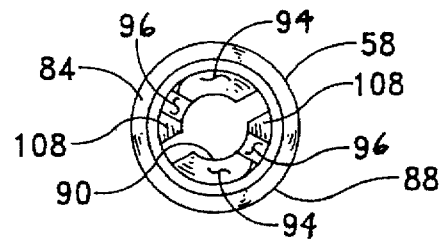
FIG. 12 is a bottom plan view of the insert.

More particularly, the cam formation 92 comprises a first cam surface 94 and a second cam surface 96. As illustrated in FIG. 10, the first cam surface 94 is formed at an angle with respect to the second cam surface 96. When attaching the stud 32 to the insert 58, the cross pin 52 rides along the first cam surface 94 to a point where it engages the second cam surface 96 and rests thereon. At this point the stud 32 is axially locked with respect to the insert 58 since the cross pin 52 of the stud 32 is positively engaged with the second cam surface 96 of the insert 58.

Figure 13:
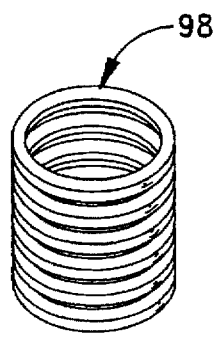
FIG. 13 is a perspective view of a helix of the receptacle assembly.
Figure 14:
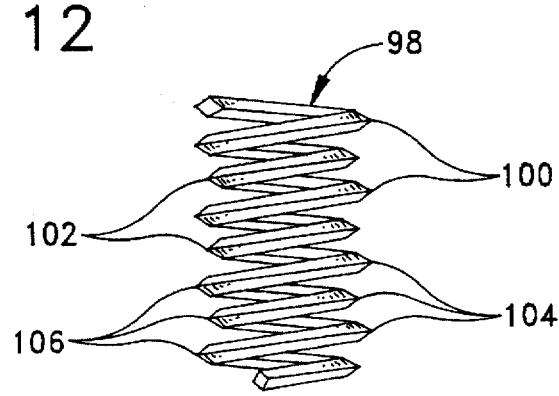
FIG. 14 is a side elevational view of the helix.

Referring to FIGS. 5, 13 and 14, means of the present invention for axially locking the insert 58 with respect to the receptacle barrel 56 embodies a helix which is generally indicated at 98. As shown, the helix 98 is preferably fabricated from cold worked stainless steel, or some other similar material. The helix 98 has a plurality of alternating large and small diameter coils 100, 102, respectively, extending along the length of the helix 98, the purpose of which will become apparent as the detailed description proceeds. As shown in FIG. 14, the helix 98 has a generally diamond-shaped-shaped cross section which defines, for each coil 100 and 102 of the helix 98, opposite, pointed side edges 104, 106.

Figure 17:
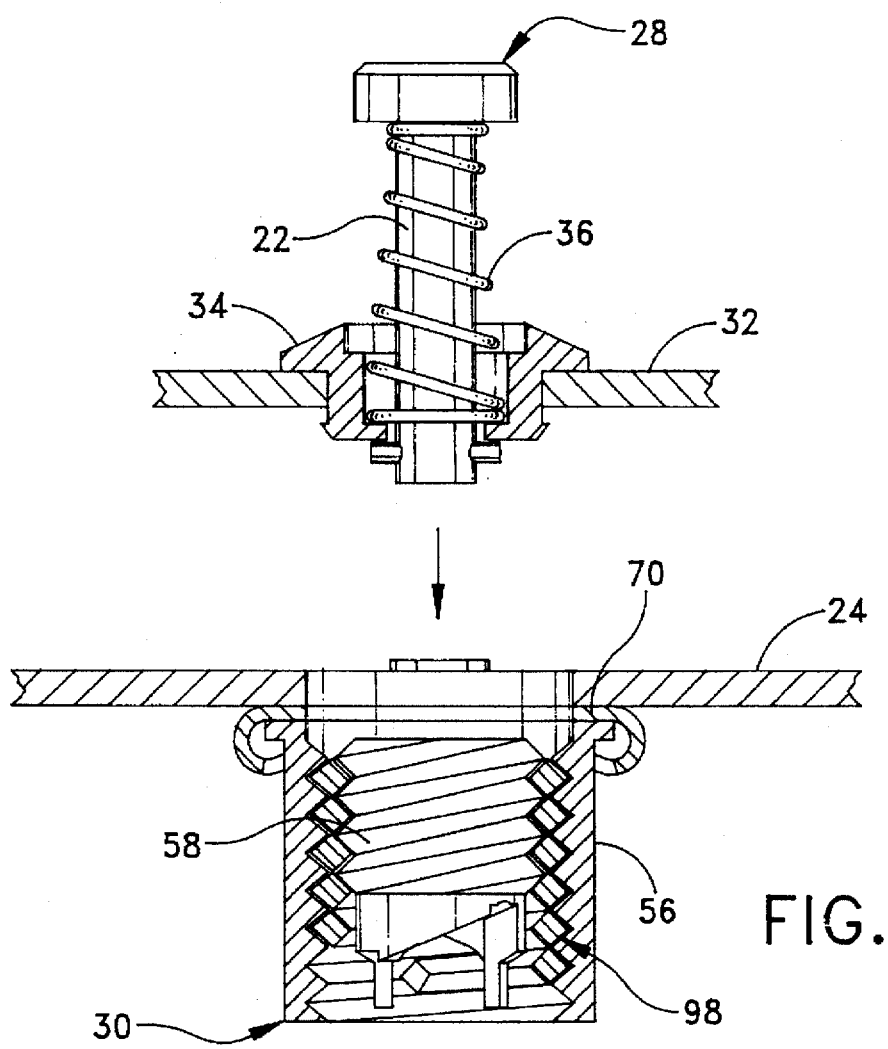
FIG. 17 is an elevational, partial cross-sectional view of the stud assembly prior to its attachment to the receptacle assembly.

FIG. 17 illustrates the stud assembly 28 prior to its threadable attachment to the receptacle assembly 30. As shown, the insert 58 is positioned within the receptacle barrel 56 adjacent the upper end of the receptacle barrel. The receptacle barrel 56 is longer in length than the insert 58 so that the insert 58 can threadably move downwardly within the receptacle barrel 56 when attaching the stud assembly 28 thereto. This ensures that the depth of attachment between the stud assembly 28 and receptacle assembly 30 can be varied so as to accommodate disparate cover and panel thicknesses. As shown, the helix 98 is disposed between the barrel 56 and the insert 58, and threadably engages the female threads 66 of the receptacle barrel 56 and the male threads 88 of the insert 58.

Figure 18:
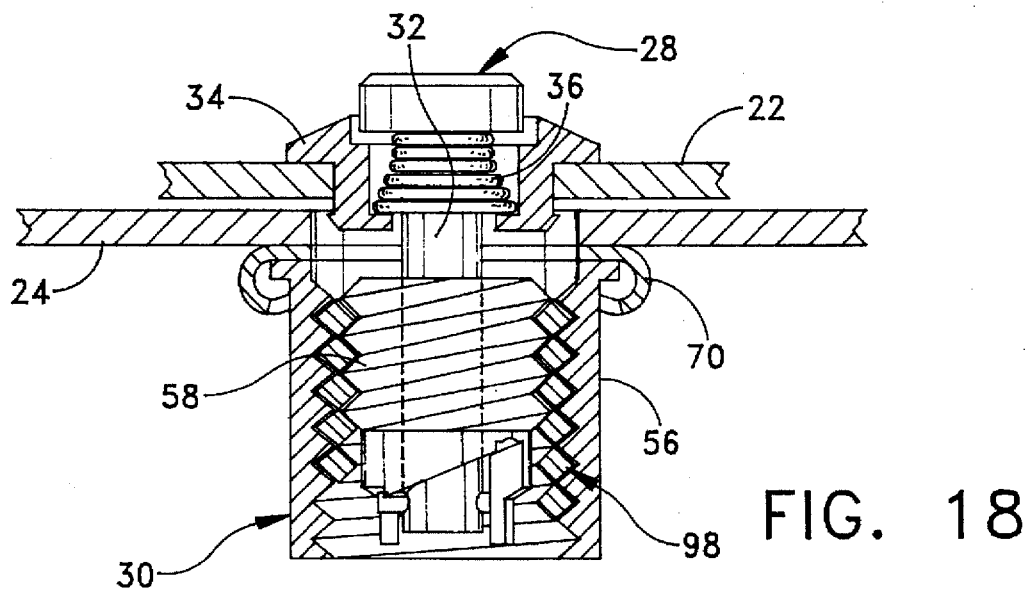
FIG. 18 is an elevational, partial cross-sectional view of the stud assembly after its attachment to the receptacle assembly.

When attaching the stud assembly 28 to the receptacle assembly 30, the spring 36 biases the stud 32 upwardly so that the head portion 50 is cleanly exposed. As the stud 32 enters the insert 58 and the cross pin 52 passes through the bore 86 of the insert 58, the spring 36 is compressed, and the stud 32 is rotated so that the cross pin 52 rides along the first cam surface 94 to the second cam surface 96. Once the cross pin 52 is positioned on the second cam surface 96, the cross pin 52 further engages a pair of detents, each indicated at 108, provided at the lower end of the insert 58. At this point, upon continued rotation of the stud 32 (e.g., by a star wrench), the cross pin 52 engages the detents 108 for rotating the insert 58 in a clockwise direction, for example, until the cover 22 is flush with the panel 24. This position is illustrated in FIG. 18. As shown, the side edges 104,106 of the helix 98 are received within the grooves constituting the female threads 66 of the barrel 56 and the male threads 88 of the insert 58 when threadably securing the insert 58 to the receptacle barrel 56. The helix 98 exerts lateral forces on the receptacle barrel 56 and the insert 58 for preventing the axial movement or creep of the insert 58 with respect to the receptacle barrel 56 so that when the stud 32 is turned counterclockwise, only the stud 32 can be removed from the insert 58 and the insert remains axially locked with respect to the barrel 56.

To install the fastener assembly 20, the aligned openings 46, 78 are formed in the cover 22 and the panel 24 for receiving the stud assembly 28 and the receptacle assembly 30, respectively. The stud 32, grommet 34 and spring 36 are provided in assembled relation, the grommet 34 being snap-fitted within the opening 46 of the cover 22 for securing the stud assembly 28 to the cover 22. The receptacle barrel 56 can then be attached to the bracket 70 by aligning the opening 74 of the bracket 70 with the elongate opening 62 of the receptacle barrel 56. The curled tab portions 80 of the bracket 70 are bent over to capture the flange 64 of the receptacle barrel 56, thereby retaining the receptacle barrel 56 to the panel 24.

The insert 58 and helix 98 are disposed within the elongate opening 62 of the receptacle barrel 56 in such a manner that the insert 58 is positioned near the top of the receptacle barrel 56 so as to ensure that the stud assembly 28 can be firmly attached to the receptacle assembly 30. As the stud 32 enters the insert 58 and the cross pin 52 passes through the bore 86 and aperture 90 of the insert 58, the stud 32 is rotated (e.g., via a star wrench) so that the cross pin 52 rides along the first cam surface 94 to the second cam surface 96. Once at the second cam surface 96, the cross pin 52 engages the detents 108 for rotating the insert 58 in a clockwise direction, for example, until the cover 22 is flush with the panel 20. At this point, the insert 58 is bottomed out within the receptacle barrel 56 and the attachment of the stud assembly 28 to the receptacle assembly 30 is completed.

To unfasten the fastening assembly 20, the stud 32 is rotated in an opposite direction (e.g., counterclockwise) whereby the cross pin 52 moves from the second cam surface 96 to the first cam surface 94. Once the cross pin 52 is aligned with the aperture 90, the stud 32 can be removed from the receptacle barrel 56. Upon unfastening all of the fastener assemblies 20 in this manner, the cover 22 can be removed from the panel 24 to allow access in opening 26.

It should be observed that the large diameter coils 100 and the small diameter coils 102 of the helix 98 provide the necessary engagement and lateral locking force between the receptacle barrel 56, the helix 98, and the insert 58. Stated another way, the coils 100, 102 provide prevailing torque on the threads 88 of the insert 58 for preventing any axial movement between the insert 58 and the receptacle barrel 56. Also, due to the diamond-shaped cross section area of the helix 98, it distributes stress loads equally throughout the receptacle barrel 56 which further strengthens the "lock" between the insert 58 and receptacle barrel 56. This reduces axial stress between the receptacle barrel 56 and the insert 58. The strength of the axial lock is far superior to that of pinning as disclosed in the well-known prior art methods, and to that of the coil disclosed in the Summers et al. patents. Therefore, it can be seen that for these reasons, the instant invention is believed to represent a significant advancement in the art and has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A fastener assembly for attaching a cover to a panel, said fastener assembly comprising:
    a stud assembly mounted on the cover, said stud assembly including a stud extending through an opening formed in the cover, said stud having a shank portion which extends through the opening in the cover and means for securing the stud to the cover in a position where the stud is biased upwardly from the cover;
    a receptacle assembly including a receptacle barrel having a cylindrical wall defining an opening of the barrel, said barrel being mounted on an inner surface of the panel, said cylindrical wall having an interior surface with female threads formed thereon, an insert having a cylindrical body defining a bore of the insert, said insert having an exterior surface with male threads formed thereon, and a helix fabricated from wire-like material, said helix having alternating large and small diameter coils extending along the length of the helix, said helix being disposed between the insert and the barrel for threadably engaging the female threads of the receptacle barrel and the male threads of the insert for preventing the axial movement of the insert with respect to the barrel; and
    means for releasably attaching the stud to the insert when releasably attaching the stud assembly to the receptacle assembly.

2. A fastener assembly as set forth in claim 1, said helix having a diamond-shaped cross section which defines, for each coil of the helix, opposite, pointed side edges which are received within grooves constituting the female threads of the barrel and the male threads of the insert.

3. A fastener assembly as set forth in claim 1, said stud further having a head portion provided on an upper end of the shank portion.

4. A fastener assembly as set forth in claim 3, said securing means comprising a grommet secured to the cover within the opening of the cover, said grommet defining an opening for receiving the shank portion of the stud therethrough.

5. A fastener assembly as set forth in claim 4, said head portion having a diameter larger than the diameter of the opening and said stud further having at is lower end a cross pin having a length greater than the diameter of the opening for preventing the axial removal of the stud from the opening of the grommet.

6. A fastener assembly as set forth in claim 4, said securing means further comprising a spring engageable at its lower end with the grommet and at its upper end with the head portion of the stud for biasing the stud away from the cover.

7. A fastener assembly as set forth in claim 1, said stud and receptacle assemblies being fabricated from corrosion resistant materials.

8. A fastener assembly as set forth in claim 1, said attaching means comprising a cross pin provided on a lower end of the shank portion, and a cam formation formed on the lower end of the insert, said bore of the insert receiving the shank portion and cross pin of the stud therethrough when releasably attaching the stud assembly to the receptacle assembly wherein the cross pin engages the cam formation of the insert for axially locking the stud to the insert.

9. A fastener assembly as set forth in claim 8, said cam formation comprising a first cam surface and a second cam surface, said first cam surface being formed at an angle with respect to the second cam surface.

10. A fastener assembly as set forth in claim 1 further comprising means for laterally aligning said stud fastener assembly with said receptacle assembly when releasably securing the stud fastener assembly thereto.

11. A fastener assembly as set forth in claim 10, said aligning means comprising a bracket mounted on the inner surface of the panel, said bracket having a pair of opposite curled tab portions, said receptacle barrel having a circumferential flange provided at an open end of the cylindrical wall, said curled tab portions engaging said circumferential flange of the receptacle barrel for allowing side-to-side movement of the barrel with respect to said bracket.

12. A fastener assembly for attaching a cover to a panel, said fastener assembly comprising:
    a stud assembly mounted on the cover, said stud assembly including
        a stud extending through an opening formed in the cover, said stud having a shank portion which extends through the opening in the cover, a head portion provided on an upper end of the shank portion, and a cross pin provided on a lower end of the shank portion,
        a grommet secured to said cover within the opening of the cover, said grommet defining an opening for receiving the shank portion of the stud therethrough, said head portion and cross pin of the stud preventing the axial removal the stud from the opening of the grommet, and a spring engageable at its lower end with the grommet and at its upper end with the head portion of the stud, said spring biasing the head portion of the stud away from the cover; and a receptacle assembly including a receptacle barrel having a cylindrical wall defining an opening of the barrel, said barrel being mounted on an inner surface of the panel, said cylindrical wall having an interior surface with female threads formed thereon, an insert having a cylindrical body defining a bore of the insert, said insert having an exterior surface with male threads formed thereon, and a cam formation formed on the lower end of the insert, said bore receiving the shank portion and cross pin of the stud therethrough when releasably attaching the stud assembly to the receptacle assembly wherein the cross pin engages the cam formation of the insert for axially locking the stud to the insert, and a helix fabricated from wire-like material, said helix having alternating large and small diameter loops extending along the length of the helix, said helix being disposed between the insert and the barrel for threadably engaging the female threads of the receptacle barrel and the male threads of the insert for preventing the axial movement of the insert with respect to the barrel.

13. A fastener assembly as set forth in claim 12, said helix having a diamond-shaped cross section which defines, for each coil of the helix, opposite, pointed side edges which are received within grooves constituting the female threads of the barrel and the male threads of the insert.

14. A fastener assembly as set forth in claim 12, said head portion having a diameter larger than the diameter of the opening and said cross pin having a length greater than the diameter of the opening for preventing the axial removal of the stud from the opening of the grommet.

15. A fastener assembly as set forth in claim 12, said cam formation comprising a first cam surface and a second cam surface, said first cam surface being formed at an angle with respect to the second cam surface.

16. A fastener assembly as set forth in claim 12, said stud and receptacle assemblies being fabricated from corrosion resistant materials.

17. A fastener assembly as set forth in claim 12 further comprising means for laterally aligning said stud fastener assembly with said receptacle assembly when releasably securing the stud fastener assembly thereto.

18. A fastener assembly as set forth in claim 17, said aligning means comprising a bracket mounted on the inner surface of the panel, said bracket having a pair of opposite curled tab portions, said receptacle barrel having a circumferential flange provided at an open end of the cylindrical wall, said curled tab portions engaging said circumferential flange of the receptacle barrel for allowing side-to-side movement of the barrel with respect to said bracket.

19. A fastener assembly for attaching a cover to a panel, said fastener assembly comprising:

a stud assembly mounted on the cover, said stud assembly including a stud extending through an opening formed in the cover, said stud having a shank portion which extends through the opening in the cover and means for securing the stud to the cover in a position where the stud is biased upwardly from the cover;

a receptacle assembly including a receptacle barrel having a cylindrical wall defining an opening of the barrel, said barrel being mounted on an inner surface of the panel, said cylindrical wall having an interior surface with female threads formed thereon, an insert having a cylindrical body defining a bore of the insert, said insert having an exterior surface with male threads formed thereon, and a helix fabricated from wire-like material, said helix having a diamond-shaped cross section which defines, for each coil of the helix, opposite, pointed side edges which are received within grooves constituting the female threads of the barrel and the male threads of the insert, said helix being disposed between the insert and the barrel for threadably engaging the female threads of the receptacle barrel and the male threads of the insert for preventing the axial movement of the insert with respect to the barrel; and means for releasably attaching the stud to the insert when releasably attaching the stud assembly to the receptacle assembly.

* * * * *